(12) United States Patent
Calvarese et al.

(10) Patent No.: US 11,630,473 B2
(45) Date of Patent: Apr. 18, 2023

(54) TWO-STAGE ENERGY STORAGE FOR LIGHT HARVESTING SYSTEMS

(71) Applicant: ZEBRA TECHNOLOGIES CORPORATION, Lincolnshire, IL (US)

(72) Inventors: Russell Calvarese, Stony Brook, NY (US); Mark W. Duron, Mastic, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/387,802

(22) Filed: Jul. 28, 2021

(65) Prior Publication Data

US 2023/0034861 A1    Feb. 2, 2023

(51) Int. Cl.
*G05F 1/67* (2006.01)
*H02J 3/46* (2006.01)

(52) U.S. Cl.
CPC ............... *G05F 1/67* (2013.01); *H02J 3/46* (2013.01); *H02J 2300/26* (2020.01)

(58) Field of Classification Search
CPC ............ G05F 1/67; H02J 3/46; H02J 2300/26
USPC ............................................................ 307/43
See application file for complete search history.

(56) References Cited

U.S. PATENT DOCUMENTS

2018/0123508 A1* 5/2018 Inoue .................. H02J 3/381

* cited by examiner

*Primary Examiner* — Hal Kaplan

(57) ABSTRACT

A system includes: an edge computing device disposed in an indoor facility having at least one light source; an energy storage subsystem configured to generate electrical power from light emitted by the at least one light source, and to supply the electrical power to the edge computing device, the energy storage subsystem including: a collector; an auxiliary energy storage device configured to receive energy collected by the collector, the auxiliary energy storage device having a first storage capacity; a main energy storage device having a second storage capacity greater than the first storage capacity; a controller configured to supply energy from the main energy storage device to the edge computing device; and a selector configured to selectively discharge energy from the auxiliary energy storage device to the main energy storage device.

15 Claims, 5 Drawing Sheets

TWO-STAGE ENERGY STORAGE FOR LIGHT HARVESTING SYSTEMS

BACKGROUND

Edge computing devices may be deployed in a wide variety of environments, including indoors, e.g. in retail facilities, warehouses, or the like. The relatively low cost and simplicity of such devices and associated sensors may enable the deployment of edge computing devices in locations that typically lack electrical power, such as on shelves in the above-mentioned facilities. Supplying power to the edge computing devices in such environments may be accomplished by way of photovoltaic panels, which generate electrical power from interior lights disposed in the facilities. The cyclical nature and/or lower intensity of indoor lighting may interfere with reliable supply of electrical power to the edge computing devices, however.

SUMMARY

In an embodiment, the present invention is a system, comprising: an edge computing device disposed in an indoor facility having at least one light source; an energy storage subsystem configured to generate electrical power from light emitted by the at least one light source, and to supply the electrical power to the edge computing device, the energy storage subsystem including: a collector; an auxiliary energy storage device configured to receive energy collected by the collector, the auxiliary energy storage device having a first storage capacity; a main energy storage device having a second storage capacity greater than the first storage capacity; a controller configured to supply energy from the main energy storage device to the edge computing device; and a selector configured to selectively discharge energy from the auxiliary energy storage device to the main energy storage device.

In another embodiment, the present invention is an energy storage subsystem, comprising: a collector; an auxiliary energy storage device configured to receive energy collected by the collector, the auxiliary energy storage device having a first storage capacity; a main energy storage device having a second storage capacity greater than the first storage capacity; a controller configured to supply energy from the main energy storage device to the edge computing device; and a selector configured to selectively discharge energy from the auxiliary energy storage device to the main energy storage device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
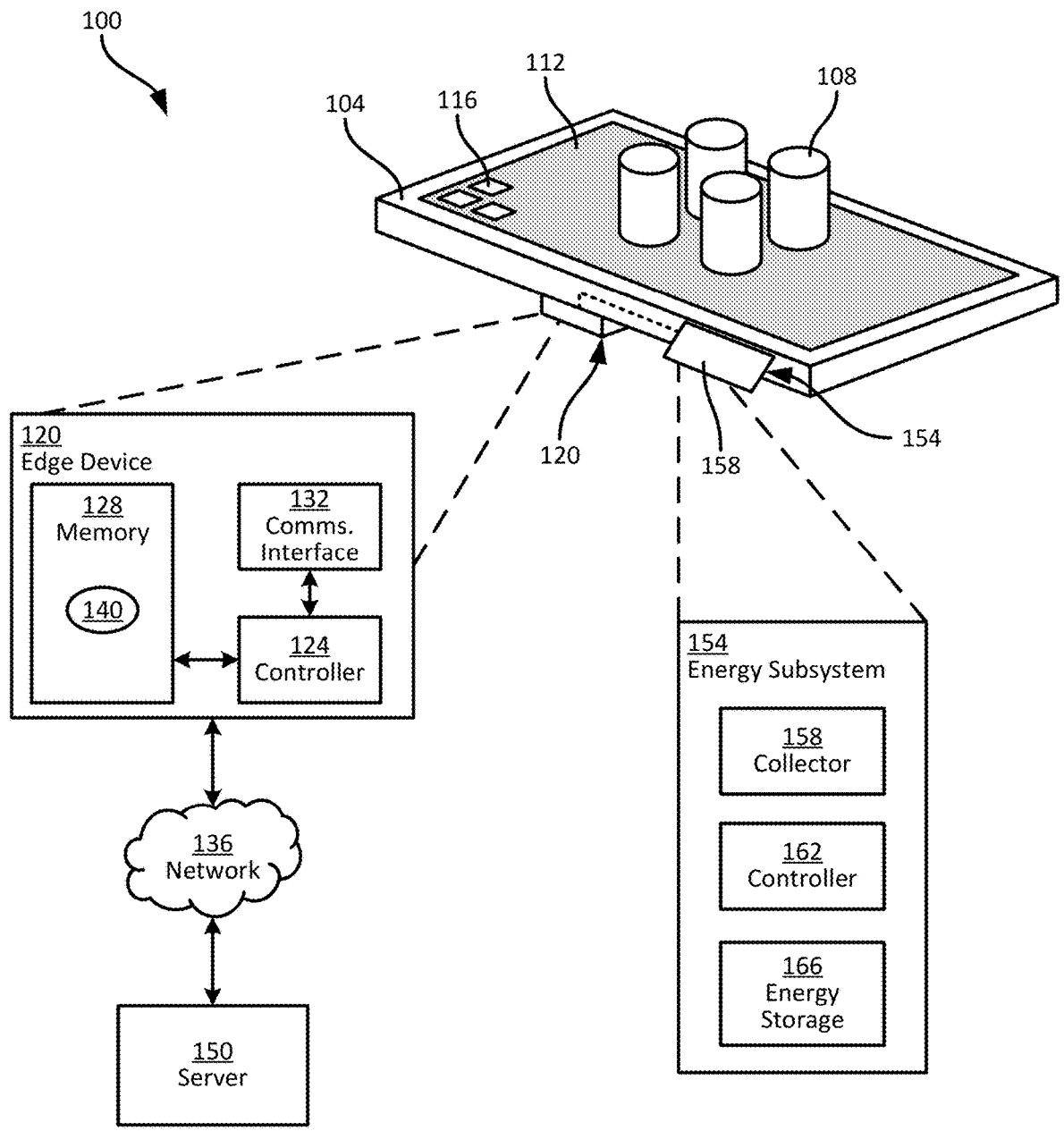
FIG. 1 is a diagram of a system for inventory monitoring.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates a system 100 for inventory monitoring, which can be deployed in a retail facility or the like. The facility can include, as in the illustrated example, a support surface 104 of a shelf, table, or other support structure. The support surface 104 is configured to support a plurality of items 108 thereon (four of which are shown in FIG. 1 for illustrative purposes), e.g. grocery items or other consumer goods. As will be apparent, the support surface 104 may be placed in a portion of the facility accessible to customers, who may travel through the facility and remove certain items 108 from the support surface 104 for purchase. As will be apparent, the facility can include a number of distinct support surfaces, e.g. arranged into shelving units organized in aisles or other suitable configurations. A single support surface 104 is shown in FIG. 1 for simplicity of illustration.

The system 100 may also be deployed in a variety of other contexts than a retail facility. For example, the system 100 can be deployed in a warehouse or other transport and logistics facility, in a manufacturing facility (e.g. to monitor inventory of raw materials and/or finished goods), or the like.

The system 100 enables monitoring of the support surface 104 to determine a number of the items 108 currently present on the support surface 104. Various actions can be taken in response to detecting changes in a number of items 108 on the support surface 104. For example, a "sweep" event may be characterized as the removal of a substantial portion of the items 108 from the support surface 104 over a short time period (e.g. removal of all items 108 present within a period of five seconds). Detection of a sweep event may be used to generate a notification to loss prevention staff or the like. Various other control actions will also occur to those skilled in the art as being enabled by item count monitoring, including triggering restocking notifications, and the like.

To detect a number of the items 108 on the support surface 104, the system 100 includes a sensor array 112, which in the present example is implemented as a pressure-sensitive mat. The sensor array 112 thus includes a plurality of pressure-sensitive elements 116, such as force-sensitive resistors (FSR), three examples of which are illustrated. The elements 116 can be arranged in a grid, such that the sensor array 112 produces a set of pressure measurements corresponding to respective positions in the grid. The pressure measurements can therefore be represented in an image, with each pixel containing a value indicating a pressure measurement. As will be apparent, the size of the three example elements 116 is exaggerated for illustrative purposes, and the sensor array 112 can include smaller and more closely spaced elements 116 in other examples. For example, one sensor array 112 can include several thousand elements (e.g. a grid of 280 by 120 elements 116).

The sensor array 112 is connected to an edge computing device 120, which is mounted on the support surface 104 itself or another nearby surface, sufficiently close physically to the sensor array 112 to be connected with the sensor array 112 via one or more connectors. The edge device 120 can include a system-on-chip (SoC) or other suitable architecture including a controller 124, a non-transitory storage device such as a memory 128 (e.g. a suitable combination of volatile and non-volatile storage elements), and a communications interface 132. The communications interface 132 can be, for example, a wireless interface such as a Bluetooth Low Energy (BLE) configured to receive and transmit data via a network 136. The network 136 can implement a plurality of communication standards, e.g. BLE to enable communication with the edge device 120, as well as Ethernet, WiFi, Zigbee, or other suitable standards to enable communication with other computing devices of the system 100, to be described in greater detail below.

The memory 128 of the edge device 120 stores computer-readable instructions 140 (which may also be referred to as an application 140), executable by the controller 124 to perform certain functionality related to the collection and processing of sensor data from the sensor array 112. Execution of the application 140 enables the controller 124 to perform certain processing of the sensor data, as well as transmission of the sensor data to other computing devices, such as a server 150 connected to the network 136. The server 150, in turn, may perform additional processing of the sensor data.

While the server 150 is provisioned with a reliable source of electrical power, the support surface 104 may be located on a structure (e.g. a shelf module) that frequently does not include infrastructure for electrical distribution. The edge device 120, therefore, may not have a connection available to facility-wide power supply circuitry. The edge device 120 does, however, require electrical power to function.

To supply power to the edge device 120 in the absence of infrastructure providing power at the support surface 140, an energy supply subsystem 154 can be deployed at the support surface 140 along with the edge device 120 (e.g. physically proximal to the edge device 120). The subsystem 154 includes a light collector 158, e.g. in the form of one or more photovoltaic (PV) cells such as a solar panel mounted on or near the support surface 104. For example, the collector 158 can include a solar panel with dimensions of about 2.5 cm by about 10 cm (e.g. about 1 inch by about 4 inches), mounted to a shelf edge. A wide variety of other form factors can also be employed for the collector 158.

In addition to the collector 158, the subsystem 154 includes a controller 162, such as a harvester chip, an example of which is a BQ25504 controller manufactured by Texas Instruments™. The controller 162 is connected to the collector 158, and therefore receives energy generated by the collector 158. That energy is directed by the controller 162 to one or more energy storage devices 166. The controller 162 itself draws power from the energy storage device 166, and also supplies power to the edge device 120 and the sensor array 112 from the energy storage device 166.

Although some examples may employ rechargeable batteries for energy storage, in the illustrated example, the energy storage device 166 includes one or more capacitors, as will be described below in greater detail. Implementing the energy storage device 166 as one or more capacitors may enable the system 100 to be deployed at a lower cost, and may also enable lower maintenance requirements over time, e.g. due to longer life cycles of the capacitors relative to batteries.

As will be apparent, the interior of the facility in which the system 100 is deployed may receive little or no sunlight. The collector 158 instead collects light emitted by artificial lighting within the facility, such as overhead lights mounted to a ceiling of the facility. Facility lighting may be dimmed or turned off overnight or for other periods of time, however. During such periods, the collector 158 generates little or no power, and the energy storage device 166 may become discharged. While provisioning a larger energy storage device 166 may avoid discharge, the increased cost of such additional capacity may be prohibitive, e.g. considering that a large number of instances of the system 100 may be deployed throughout the facility.

When the energy storage device 166 is discharged (e.g. particularly when capacitors are employed as primary energy storage), the controller 162 may be required to operate in a "cold start" mode for a period of time, until the energy storage device 166 has charged sufficiently to begin regular operation of the controller 162 and subsequent operation of the edge device 120. In the cold start mode, however, the controller 162 may be unable to perform maximum power point (MPP) tracking, which enables optimized power transfer from the collector 158 to the energy storage device 166. As a result, charging of the energy storage device 166 may be inefficient and the period of time during which the controller 162 must remain in the cold start mode (and during which the edge device 120 remains dormant) may be lengthy. For example, in the case of a solar panel sized as mentioned above, with a storage device 166 in the form of a capacitor with a capacity of about 1000 uF, charging the capacitor from a cold start to a level sufficient for the controller 162 to begin normal operation may take several hours. A delay of that length may result in the edge device 120 remaining inoperative into active hours for the facility, during which inventory monitoring is expected to be available.

The system 100, and in particular the energy supply subsystem 154, therefore include additional components and functionality enabling the cold start to be accelerated to consume a shorter period of time, e.g. several minutes or less, rather than several hours. As will be described below in greater detail, the energy storage device 166 defines two stages of energy storage, with different capacities. The first of the above stages enables the controller 162 to rapidly exit the cold start mode and begin regular operation, which also enables more efficient charging of the energy storage device 166. The second of the above stages provides increased capacity for use when regular operation of the controller 162 is initiated, and for use in powering the edge device 120.

Figure 2:
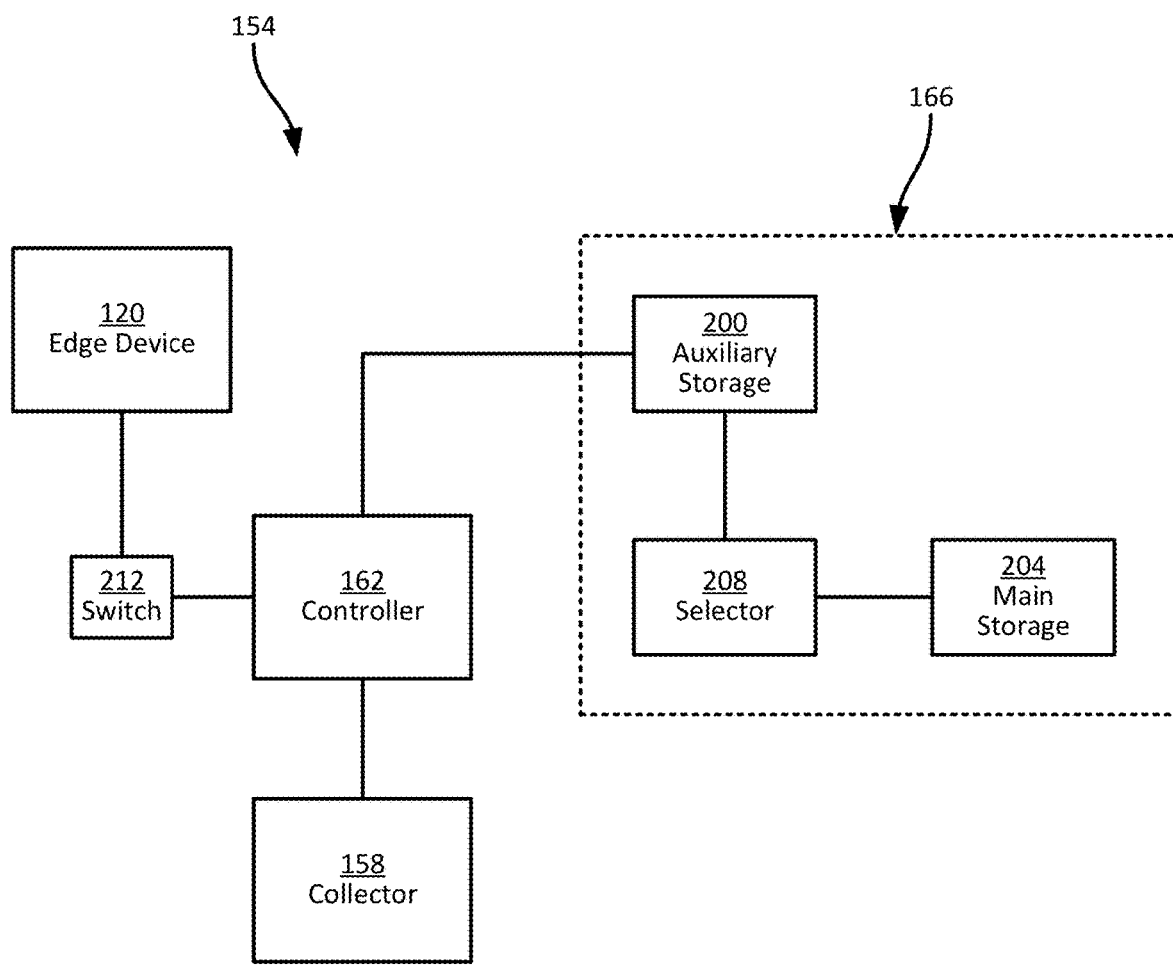
FIG. 2 is a diagram of the energy supply subsystem of FIG. 1.

Turning to FIG. 2, the energy supply subsystem 154 is shown in greater detail. In particular, certain components of the energy storage device 166 are illustrated in greater detail. The energy storage device 166 includes an auxiliary storage device 200, forming the first stage mentioned above, and a main storage device 204, forming the second stage mentioned above. The auxiliary storage device 200 and the main storage device 204 are capacitors, in this example. However, the capacities of the devices 200 and 204 differ substantially. For example, the capacity of the auxiliary storage device 200 can be between about 0.1 uF and 100 uF, while the capacity of the main storage device 204 can be greater than 100 uF. For example, the capacity of the main storage device 204 can be between about 1000 mF and 2000 mF. In other examples, the capacity of the main storage device 204 can be greater than 2000 mF. The devices 200 can also be implemented with a wide variety of other capacities, in other examples, dependent on the nature of the edge device, the length of time the system 100 is expected to operate continuously, and the like. In general, the capacity of the main storage device 204 exceeds the capacity of the auxiliary storage device 200, e.g. by at least a factor of ten and in some embodiments by several orders of magnitude.

Functionally, the role of the main storage device 204 (forming the second stage of the energy storage device 166) is to store and dispense sufficient energy to power the edge device 120, as well as the controller 162 (although the power demands of the controller 162 may be substantially lower than those of the edge device 120). The role of the auxiliary storage device 200, in contrast, is to enable the rapid transition of the controller 162 from the cold start state to a normal operational state, in which MPP tracking functionality is restored, enabling rapid charging of the main storage device 204. The role of the auxiliary storage device 200 is reflected in the reduced capacity of the device 200 relative to the device 204. That is, the storage device 200 itself is not required to power the edge device 120, nor is the storage device 200 required to power the controller 162 independently of the main storage device 204 for a significant period of time (e.g. more than a few minutes).

As seen in FIG. 2, energy received at the controller 162 from the collector 158 is directed first to the auxiliary storage device 200. The reduced capacity of the auxiliary storage device 200 relative to the main storage device 204 enables the auxiliary storage device 200 to more rapidly reach a voltage at which the controller 162 can begin regular operation (i.e. exiting cold start operation). As will be apparent, return connections from the energy storage device 166 to the controller 162 to power the controller 162 are not shown, for simplicity of illustration.

The energy storage device 166 also includes a selector 208 connected between the auxiliary storage device 200 and the main storage device 204. The selector 208, as discussed below, is configured to enable transfer of energy stored in the auxiliary storage device 200 to the main storage device 204 under certain conditions, thus allowing the main storage device 204 to be charged while retaining sufficient energy in the auxiliary storage device 200 to reach and maintain regular operation at the controller 162. The controller 162 is configured, as noted above in connection with FIG. 1, to supply power to the edge device 120, e.g. via a switch 212.

Figure 3:
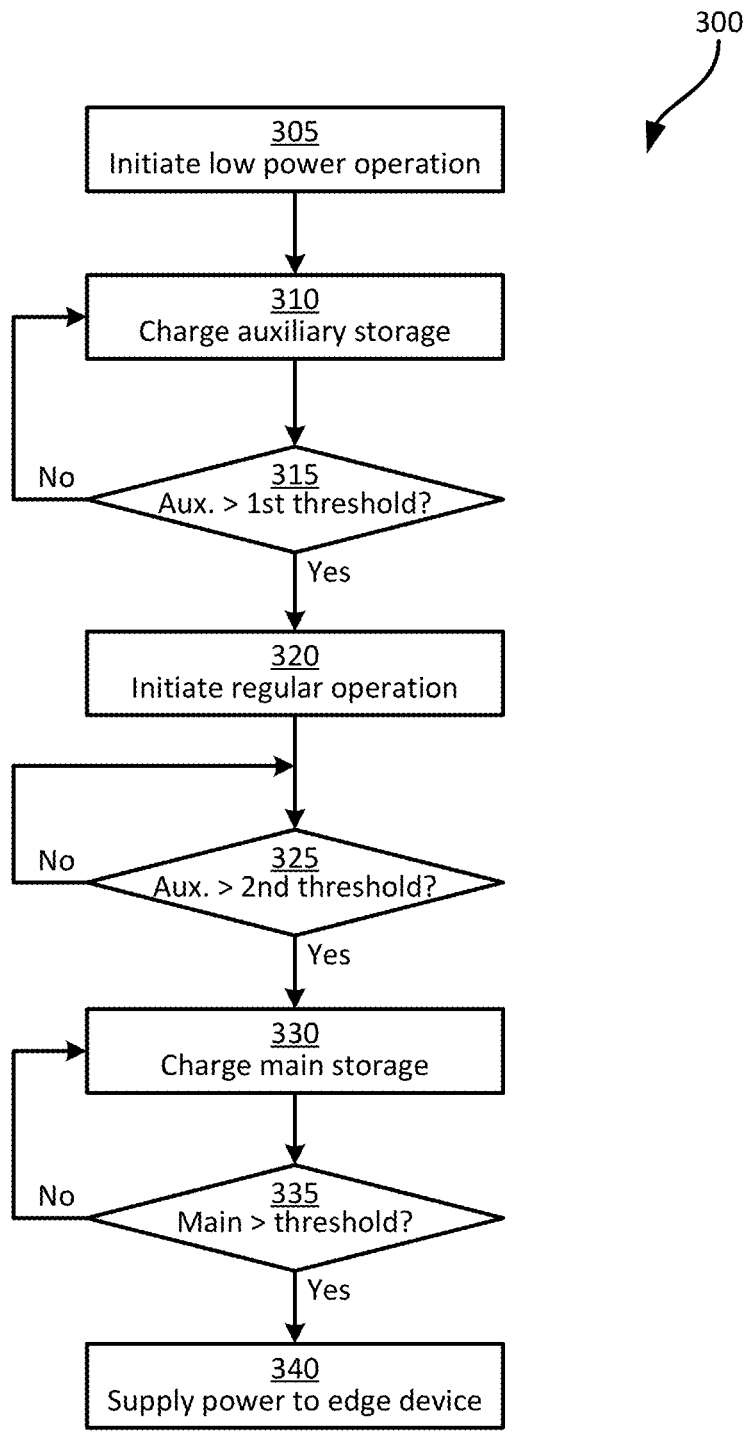
FIG. 3 is a flowchart of a method of charging the energy storage device of FIG. 2.

Turning now to FIG. 3, a method 300 of charging the energy storage device 166 is illustrated, as performed by the energy supply subsystem 154. It is assumed that, prior to beginning performance of the method 300, the energy storage device 166 is fully discharged, e.g. because the facility light sources mentioned above were turned off overnight.

At block 305, in response to the collector 158 beginning to generate electrical power, e.g. when the lights mentioned above turn on, the controller 162 is configured to begin low power operation. Low power operation can include the above-mentioned cold start mode, in which most functions of the controller 162 remain disabled. For example, in the low power or cold start mode, the controller 162 may enable only a cold start circuit that functions as an unregulated boost converter, transferring energy from the collector 158 to the storage device 166. The cold start circuit may have a lower efficiency than the boosting circuitry activated during normal operation, at least in part because the controller 162 is unable, in the cold start mode, to reconfigure the load presented to the collector 158 in order to match impedances at the output of the collector 158 and the input of the controller 162. In some examples, the controller 162 can be configured to apply preconfigured start-up values at block 305, e.g. based on expected light levels within the facility, as such light levels are generally expected to be consistent over time. The controller 162 may therefore employ the start-up values to reduce the amount of time spent in low power operation, despite being unable to dynamically adjust load characteristics presented to the collector 158. The start-up values can be stored by electronic potentiometers with non-volatile memory in some examples. In other examples, the start-up values can be preset with resistors during manufacture of the controller 162 and/or subsystem 154.

Thus, at block 305, energy generated by the collector 158 is transferred, via the controller 162 in a low power mode, to the auxiliary storage device 200. The efficiency of the above transfer may be low, as a result of the lack of MPP tracking at the controller 162.

At block 310, following initiation of low-power operation (or, as seen below, when the determination at block 315 is negative), while the controller 162 is still operating in the low power/cold start mode, charging of the auxiliary storage device 200 continues.

At block 315, the controller 162 is configured to determine whether the auxiliary storage device 200 has been charged to a voltage exceeding a first threshold. The first threshold is the voltage at which the controller 162 can draw power from the auxiliary storage device 200 to exit the cold start mode and begin regular operation, including MPP tracking functionality that enables more efficient charging of the energy storage device 166. The first threshold is therefore selected according to the operational parameters of the controller 162. For example, the controller 162 may require a supply voltage of about 1.8 V to begin regular operation. The first threshold is therefore set at about 1.8 V. In other examples, the first threshold can vary with the capabilities and requirements of the controller 162.

The initial goal, therefore, is for the auxiliary storage device 200 to reach the first threshold voltage mentioned above. Until the first threshold is reached, charging of the auxiliary storage device 200 continues, while the controller 162 remains in the cold start mode and the main storage device 204 remains discharged.

When the determination at block 315 is affirmative, at block 320 the controller 162 exits the cold start mode and begins regular operation. During regular operation, as noted above, the controller 162 can perform MPP tracking measurements and reconfigured the load presented to the collector 158 to increase the power transfer from the collector 158 to the energy storage device 166 (via the controller 162 itself).

Specifically, at block 325 the selector 208 is configured to determine whether the voltage at the auxiliary storage device 200 exceeds a second threshold, greater than the first threshold mentioned above. When the determination at block 325 is negative, charging of the auxiliary storage device 200 continues, and the determination at block 325 is repeated. When the determination at block 325 is affirmative, however, the energy storage device 166 proceeds to block 330.

At block 330, the selector 208 is configured to transfer energy from the auxiliary storage device 200 to the main storage device 204. As will now be apparent, the second threshold evaluated at block 325 is greater than the first threshold used at block 310 to ensure that energy is not transferred from the auxiliary storage device 200 to the main storage device 204 until the voltage of the auxiliary storage device is sufficiently high that such a transfer (which will decrease the voltage of the auxiliary storage device 200) does not force the controller 162 to return to a low power state. For example, the second threshold may be set to about 80% of an expected maximum transfer point, e.g. selected based on previously measured characteristics of the collector 158 under the consistent lighting conditions in the facility.

The transfer of energy from the auxiliary storage device 200 to the main storage device 204 at block 330 may be mediated by one or more devices configured to limit the amount of energy transferred, to prevent the auxiliary storage device 200 from dropping to a voltage at which the controller 162 cannot remain in a regular operational mode. For example, energy transferred from the auxiliary storage device 200 to the main storage device 204 can be transferred via one or more resistive and/or inductive elements, a flyback converter, or the like. As a result, the transfer initiated at block 330 ceases when the voltage of the auxiliary storage device 200 has dropped by a predefined degree, remaining above the first threshold from block 310.

Following block 330, at block 335 the controller 162 can be configured to determine whether the voltage of the main storage device 204 exceeds a further threshold (i.e. distinct from the first and second thresholds mentioned above). The threshold applied at block 335 can be selected to correspond to an amount of energy stored in the main storage device 204 that is sufficient to begin operation of the edge device 120. When the determination at block 335 is affirmative, at block 340 the controller 162 begins supplying power to the edge device 120 (or any other connected load) from either or both of the main storage device 204 and the collector 158. When the determination at block 335 is negative, charging of the auxiliary storage device 200 and the main storage device 204 (as applicable, according to the voltage of the auxiliary storage device 200) continues as described above.

Figure 4:
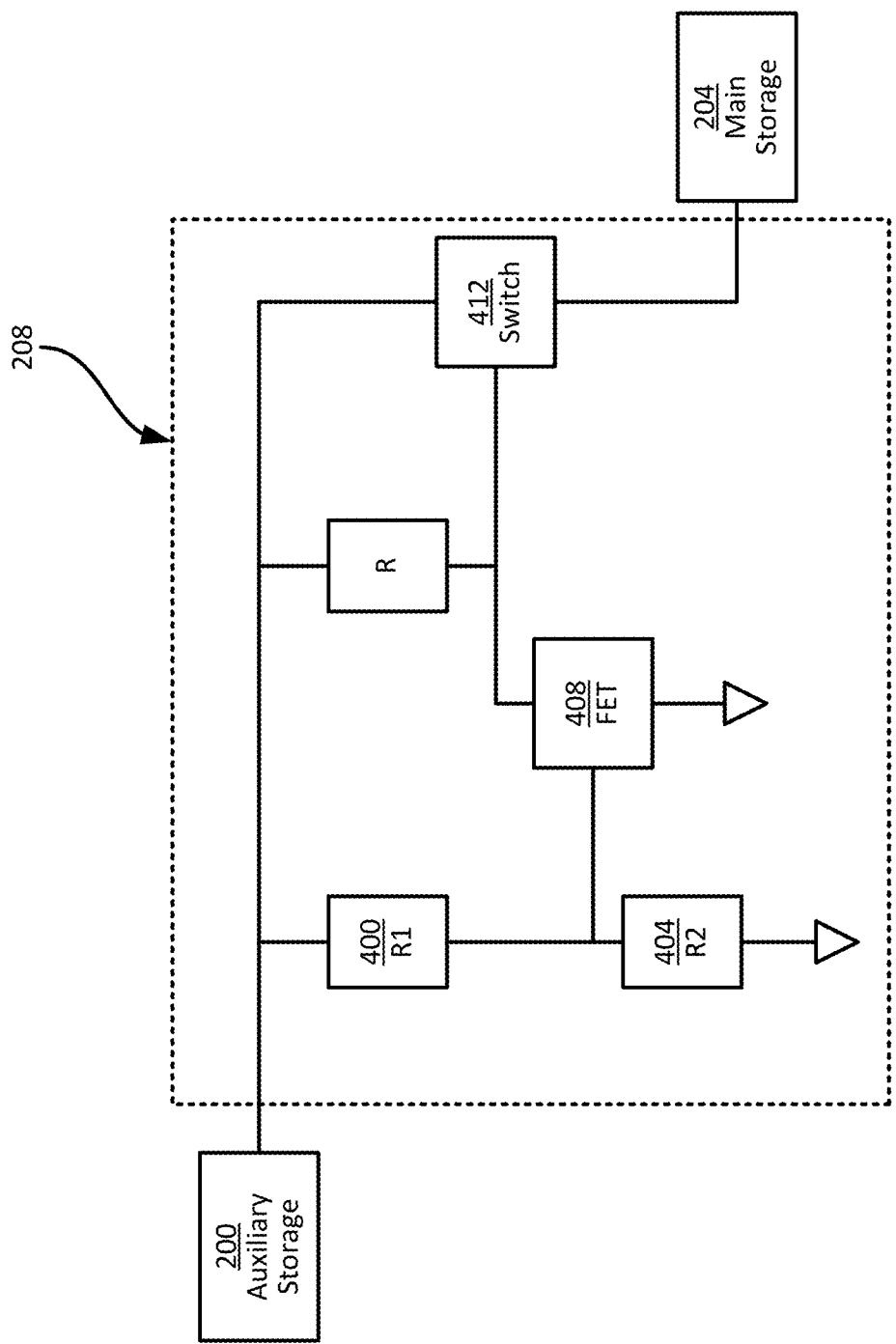
FIG. 4 is a diagram of certain components of the energy storage device of FIG. 2.

FIG. 4 illustrates an example implementation of the selector 208, in the form of a voltage comparator and a switch. Specifically, the voltage comparator is implemented via two resistive elements 400 and 404, and a field-effect transistor (FET) 408. When the voltage at the auxiliary storage device 200 exceeds the first threshold, defined by the resistive elements 400 and 404, the FET 408 applies a signal to a switch 412, connecting the input and output of the switch 412 to enable power transfer to the main storage device 204.

Figure 5:
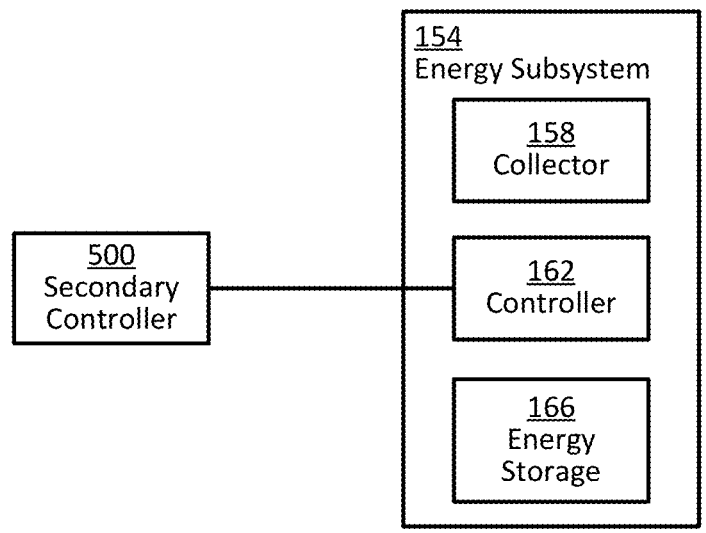
FIG. 5 is a diagram of another example energy supply subsystem.

In some examples, the system 100 can include further control functionality to affect the frequency of MPP tracking measurements performed by the controller 162. For example, the controller 162 may be configured by default to perform MPP measurements every 30 seconds. However, in the context of relatively consistent indoor lighting, less frequent MPP measurements may be suitable, and may increase the efficiency of the subsystem 154, as each MPP measurement requires a brief disconnection of the energy storage device 166 from the collector 158 (resulting in no energy collection during that period). As shown in FIG. 5, therefore, in some examples a secondary controller 500, e.g. a low-power microprocessor, can be deployed alongside the subsystem 154. The secondary controller 500 can provide control signals to the controller 162 defining a frequency of MPP measurement, and/or explicitly initiating individual MPP measurement actions. For example the controller 500 can be coupled to a light sensor (not shown), and can initiate an MPP measurement in response to detecting a transient drop in ambient light levels. Such a drop may correspond to a shadow, e.g. from a person or vehicle passing the support surface 104. Initiating an MPP measurement after such a transient drop has subsided (e.g. after ambient light levels have returned from the drop) may ensure that the load characteristics presented to the collector 158 are not adversely tuned to the transient artifact.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system, comprising:
    an edge computing device disposed in an indoor facility having at least one light source;
    an energy storage subsystem configured to generate electrical power from light emitted by the at least one light source, and to supply the electrical power to the edge computing device, the energy storage subsystem including:
    a collector;
    an auxiliary energy storage device configured to receive energy collected by the collector, the auxiliary energy storage device having a first storage capacity;
    a main energy storage device having a second storage capacity greater than the first storage capacity;
    a controller configured to supply energy from the main energy storage device to the edge computing device; and
    a selector configured to selectively discharge energy from the auxiliary energy storage device to the main energy storage device.

2. The system of claim 1, wherein the controller is configured to:
    initiate operation in a low power mode;
    in response to detecting that a voltage of the auxiliary storage device exceeds a threshold, transition to a regular operational mode.

3. The system of claim 2, wherein the controller is configured to draw energy from at least one of the auxiliary storage device and the main storage device in the regular operational mode.

4. The system of claim 1, wherein the selector is configured to transfer energy from the auxiliary energy storage device to the main energy storage device in response to a voltage of the auxiliary storage device exceeding a threshold.

5. The system of claim 4, wherein the selector includes:
    a switch; and
    a voltage comparator configured (i) to determine whether the voltage of the auxiliary storage device exceeds the threshold, and (ii) activate the switch when the determination is affirmative.

6. The system of claim 1, wherein the auxiliary energy storage device includes a capacitor with a capacitance between about 0.1 uF and 100 uF.

7. The system of claim 1, wherein the main energy storage device includes a capacitor with a capacitance between about 100 uF and 2000 mF.

8. The system of claim 1, wherein the edge computing device includes a processor coupled to a pressure-sensitive mat.

9. An energy storage subsystem, comprising:
- a collector;
- an auxiliary energy storage device configured to receive energy collected by the collector, the auxiliary energy storage device having a first storage capacity;
- a main energy storage device having a second storage capacity greater than the first storage capacity;
- a controller configured to supply energy from the main energy storage device to an edge computing device; and
- a selector configured to selectively discharge energy from the auxiliary energy storage device to the main energy storage device.

10. The subsystem of claim 9, wherein the controller is configured to:
- initiate operation in a low power mode;
- in response to detecting that a voltage of the auxiliary storage device exceeds a threshold, transition to a regular operational mode.

11. The subsystem of claim 10, wherein the controller is configured to draw energy from at least one of the auxiliary storage device and the main storage device in the regular operational mode.

12. The subsystem of claim 9, wherein the selector is configured to transfer energy from the auxiliary energy storage device to the main energy storage device in response to a voltage of the auxiliary storage device exceeding a threshold.

13. The subsystem of claim 12, wherein the selector includes:
- a switch; and
- a voltage comparator configured (i) to determine whether the voltage of the auxiliary storage device exceeds the threshold, and (ii) activate the switch when the determination is affirmative.

14. The subsystem of claim 9, wherein the auxiliary energy storage device includes a capacitor with a capacitance between about 0.1 uF and 100 uF.

15. The subsystem of claim 9, wherein the main energy storage device includes a capacitor with a capacitance between about 100 uF and 2000 mF.

* * * * *